(12) United States Patent
Charnley, Jr.

(10) Patent No.: US 7,546,264 B2
(45) Date of Patent: *Jun. 9, 2009

(54) METHOD FOR SELECTING INVESTMENTS IN BOOK-VALUED COLLECTIVE INVESTMENT FUNDS

(75) Inventor: James Allen Charnley, Jr., Barrington, RI (US)

(73) Assignee: Water Street Advisers, Inc., Barrington, RI (US)

(*) Notice: Subject to any disclaimer, the term of this patent is extended or adjusted under 35 U.S.C. 154(b) by 1349 days.

This patent is subject to a terminal disclaimer.

(21) Appl. No.: 10/079,022

(22) Filed: Feb. 20, 2002

(65) Prior Publication Data

US 2003/0130923 A1    Jul. 10, 2003

Related U.S. Application Data

(60) Provisional application No. 60/342,825, filed on Dec. 28, 2001.

(51) Int. Cl.
G06Q 40/00 (2006.01)
(52) U.S. Cl. .................................................. 705/36 R
(58) Field of Classification Search .................. 705/35, 705/36 R; 708/800–806; 345/24, 440, 418, 345/501–502, 522, 619
See application file for complete search history.

(56) References Cited

U.S. PATENT DOCUMENTS

| | | | |
|---|---|---|---|
| 5,109,475 A | 4/1992 | Kosaka et al. | 395/22 |
| 5,729,700 A * | 3/1998 | Melnikoff | 705/36 R |
| 5,761,442 A | 6/1998 | Barr et al. | 395/236 |
| 5,774,881 A | 6/1998 | Friend et al. | 705/36 |

(Continued)

OTHER PUBLICATIONS

James Charnley, Water Street Advisers Inc., ADV Part 2, (visited Mar. 3, 2007) ,http://www.wtrstr.com.htm> (specifically Schedule F of Form ADV, Jun. 16, 2006, p. 8-9).*

(Continued)

*Primary Examiner*—Mary Cheung
(74) *Attorney, Agent, or Firm*—Barlow, Josephs & Holmes, Ltd.

(57) ABSTRACT

A process for selecting investments from a population of book-valued collective funds uses a determination of the past average investment performance of funds within an asset class. Past performance is measured in a "means-variance" analysis. The selection process determines anomalies from a theoretical population distribution that is uniformly random with a normal distribution around the measured past performance averages for the asset class. Investment return is calculated as the average of past periodic returns. Investment risk can be the variance of those past returns around their average, or the covariance of those past returns with those of a benchmark that can be the population average of past periodic returns or past periodic returns of an associated market index. Variances are identified preferably by dividing or scaling the performance distribution into four to twenty-five areas of what should be equal-sized fund populations assuming a normal distribution of risk and return about the center of each for the asset class population. The actual population in each equal area is measured, and these measurements are ranked. Investment selection is for those funds found in areas having a high ranking. The selected group exhibits a performance significantly stronger than the "asset class" average performance for at least thirty-six months.

13 Claims, 9 Drawing Sheets

U.S. PATENT DOCUMENTS

| | | | |
|---|---|---|---|
| 5,784,696 | A | 7/1998 | Melnikoff |
| 5,806,049 | A | 9/1998 | Petruzzi |
| 5,812,988 | A * | 9/1998 | Sandretto ................... 705/36 R |
| 5,884,287 | A | 3/1999 | Edesess ........................ 705/36 |
| 5,918,217 | A * | 6/1999 | Maggioncalda et al. ... 705/36 R |
| 5,978,778 | A | 11/1999 | O'Shaughnessy ............ 705/36 |
| 5,987,433 | A | 11/1999 | Crapo ......................... 705/36 |
| 6,003,018 | A | 12/1999 | Michaud et al. |
| 6,018,722 | A | 1/2000 | Ray et al. ..................... 705/36 |
| 6,021,397 | A | 2/2000 | Jones et al. ................... 705/36 |
| 6,078,904 | A * | 6/2000 | Rebane ...................... 705/36 R |
| 6,125,355 | A | 9/2000 | Bekaert et al. ................ 705/36 |
| 6,188,992 | B1 | 2/2001 | French ........................ 705/36 |
| 6,275,814 | B1 | 8/2001 | Giansante et al. ............. 705/36 |
| 6,282,520 | B1 * | 8/2001 | Schirripa ................... 705/36 R |
| 6,292,787 | B1 | 9/2001 | Scott et al. .................... 705/36 |
| 6,912,509 | B1 * | 6/2005 | Lear ........................ 705/36 R |
| 7,171,385 | B1 * | 1/2007 | Dembo et al. ............. 705/36 R |
| 2001/0011243 | A1 * | 8/2001 | Dembo et al. ................. 705/36 |
| 2002/0007329 | A1 * | 1/2002 | Alcaly et al. .................. 705/35 |
| 2002/0013752 | A1 * | 1/2002 | Johnson et al. ............... 705/36 |
| 2002/0174047 | A1 * | 11/2002 | Fernholz ...................... 705/36 |
| 2003/0018556 | A1 * | 1/2003 | Squyres ........................ 705/36 |

OTHER PUBLICATIONS

Jack P. Friedman, Dictionary of Business Terms, Barron's Educational Series, 3rd ed., p. 601.*

Roenfeldt and Cooley, Ranking Investments by Risk and Return, Jul.-Aug. 1977, Atlanta Economic Review, all pages.*

Linus Schrage, Optimization Applications in Finance, May 2, 1999, p. 1-6.*

Jay L. Devore, Probability and Statistics for Engineering and the Sciences, Brooks/Cole Publishing Company, 3re ed., p. 141-2, 257-263, and p. 334-5.*

University of Florida Department of Statistics, UF/Statistics Graduated Curriculum and Courses, (visited Mar. 3, 2007), http://www.stat.ufl.edu/academics/grad/grad_courses.shtml>.*

Markowitz, Harry, "Portfolio Selection", The Journal of Finance, vol. VII, No. 1, pp. 77-91, Mar. 1952.

Sharpe, William F., "Capital Asset Prices: A Theory of Market Equilibrium Under Conditions of Risk", The Journal of Finance, vol. XIX, No. 3, pp. 425-442, Sep, 1964.

Carhart, Mark M., "On Persistence in Mutual Fund Performance", The Journal of Finance, vol. 52, No. 1, pp. 57-82, Mar. 1997.

Cochrane, John H., "New fact in finance", Economic Perspectives, Federal Reserve Bank of Chicago, pp. 36-58.

Downes, John and Goodman, Jordan Elliot, "Dictionary of Finance and Investment Terms", Barron's Educational Series, Inc., 1985.

Cohen, Jerome B., Zinbarg, Edward D., and Zeikel, Arthur, "Investment Analysis and Portfolio Management", 4th Ed, Richard D. Irwin, Inc., Homewood, IL, 1982.

Alexander, Gordon J. and Sharpe, William F., "Fundamentals of Investments", Prentice Hall, Inc., Englewood Cliffs, NJ 1989, Hagstrom Jr., Robert G., "The Warren Buffett Way—Investment Strategies of the World's Greatest Investor", John Wiley & Sons, Inc., 1995.

* cited by examiner

METHOD FOR SELECTING INVESTMENTS IN BOOK-VALUED COLLECTIVE INVESTMENT FUNDS

This application claims the benefit of U.S. Provisional Application Ser. No. 60/342,825, filed Dec. 28, 2001.

FIELD OF THE INVENTION

This invention relates to methods for making investment selections. More specifically, it relates to a method for selecting investments in book-valued collective investment funds, such as a portfolio of open-ended mutual funds, based on the past performance of such funds in a given asset class.

BACKGROUND OF THE INVENTION

Investment managers have used a variety of theories, models and methods to guide their selection of investments in order to produce a desired level of return on an investment consistent with an expected degree of risk. This selection process is generally preceded by a process to select for a strategy for allocating an investment amount among various asset classes made from the available investment assets, and forms the subsequent process of selecting for the particular investments within each asset class with which to populate these strategies. Professional investment managers typically invest in categories of assets made from securities and including stocks, bonds and cash or cash equivalent investments such as short-term Treasury bills.

Beginning in the mid-1980's, one type of securities investment for which demand has grown enormously is mutual funds, and in particular, open-ended mutual funds. Mutual funds are "collective investment funds", raising the capital through the sale of shares to collectively acquire and hold other securities. The share value of these mutual funds reflects the aggregate net-asset value (NAV) of the stocks held in the fund, as opposed to the market price of the fund's shares, as determined by investor demand, as is the case with shares of a closed-end mutual fund. Mutual funds are an example of a type of investments that can be termed "book-valued", as opposed to market-valued. For book-valued collective investment funds, the expected return and risk is dependent on the expected future actions of the fund's management, and not on the vagaries of future market demand for their shares. For this reason, investment managers have long looked for ways to analyze the past performance of book-valued collective funds, relying on the persistence of fund manager performance to guide their selections of future fund investments to reliably produce a desired average level of returns, again, for an expected level of risk.

In the prior art, many attempts have been made to predict differences in future investment performance arising between funds within an asset class. Those that undertake such predictions use a standard system of performance measurement first introduced in of *Modern Portfolio Theory* (1952) to frame their efforts. In MPT, Dr. Harry Markowitz introduced the approach of evaluating investments in terms of a utility function that reflected both the expected return and the expected risk of an investment. He plotted past investment return (benefit) against the risk to the investment associated with that level of return (cost). This risk-return relationship is what is commonly referred to as 'investment performance' within the industry, and is denoted by the term 'risk-adjusted returns'.

Dr. Markowitz also created the mathematical proof that the returns of an investment portfolio as a whole can be maximized for a given level of risk by combining investments that have dissimilar and offsetting patterns of returns variance, demonstrating that a portfolio's return variance is the product of the variances of each investment, plus the product of the pair-wise cross or co-variances between each investment. This approach of combining investments of dissimilar risk has become the primary strategy for allocating portfolio assets within the industry, and is the precursor asset allocation strategy process on which the investment selection process of this Application, as well as many others, rests.

The segmentation of the process of creating an investment portfolio into the processes of asset allocation strategy selection and subsequent investment selection process is driven by practical concerns. With a large population of available investments, computation of the pair-wise covariance between the returns of each investment option as required by asset allocation processes such as outlined in Markowitz' Modern Portfolio Theory have historically been a burdensome and slow process. As a result, managers have typically focused their asset allocation strategies on the combination of broad asset classes, deciding what allocation of available investment resources should be placed in each asset class. Under MPT, these asset classes are, by definition, groups of investments with uniquely similar patterns and levels of risk, and can be identified by one of several methods. The pattern and level of past returns of individual investments can be analyzed and grouped, or in the case of mutual funds, groups can be formed from categories of funds with similar stated investment objectives. Pair-wise co-variance analysis then becomes a simpler exercise, using a small number of broad asset classes as proxies for the funds contained within each class.

The prevailing academic theory regarding the distribution of the investments within an asset class in terms of their investment performance has assumed that such distribution is random. The population density of investments within an asset class, measured in terms of the joint probability function of risk and returns, is assumed to conform to a normal, symmetrical distribution. Professor William Sharpe popularized this belief in his 1964 thesis, *Capital Asset Prices: A Theory of Market Equilibrium Under Conditions of Risk*, and elsewhere, teaching that the relationship between the return for the investments within an asset class and the risk of these investments could be plotted in a two-dimensional risk-return space as a straight line that runs from the return on a zero-risk investment (typically taken as a U.S. Treasury Bill) through a rate of return associated with the average risk and return for the asset class or an associated market index. A deviation in an investment's performance from this 'securities market' or 'equilibrium' line has been characterized by Professor Sharpe and others as 'random error', the population of these random errors making up a normal distribution around the equilibrium line and summing to zero.

Professor Sharpe introduced an alternative measure of risk with his model, 'beta'; a variable risk measure comprised of the covariance between an investment's periodic returns and those of the asset class average or associated benchmark. Using Professor Sharpe's risk measure, deviations in performance from an equilibrium line are an investment's 'alpha'. Using Markowitz's absolute-risk measure, the deviation is an investments 'differential return'.

Under either risk measure, the equilibrium line represents the asset-class average performance. Investments whose risk-adjusted returns lie above this line have a stronger than average performance. The steepness of this equilibrium line is reflective of the strength of the performance of the asset class as a whole. Prof. Sharpe's work has led to the practice of using the risk-adjusted return calculated from the slope of the equilibrium line of an asset class to be a proxy for the performance of individual investments within the class. Professors Markowitz and Sharpe received Nobel Prizes for their work in this area.

Prior to the last few years, consideration of investment selection theory and methods for predicting differences in future investment performance have been primarily academic. Overviews of this academic work appear in "On Persistence in Mutual Fund Performance", *Journal of Finance* (March 1997) by Mark Carhart, and "New Facts in Finance", *Economic Perspective*, Federal Reserve Bank of Chicago (1999) by John Cochrane. Much of this work has common roots in, and builds upon, the general theoretical framework of the work of Markowitz and Sharpe. The focus of this work has been, in general, either a study of (i) whether mutual funds can out-perform the general securities market, or (ii) whether the future performance of funds can be predicted from past performance. The second question is pertinent here. Processes to identify predictive differences have usually relied on methods to form groups of funds within an asset class population based on similar levels of past returns, risk or investment performance. While in general, earlier work following Markowitz and then Sharpe found no predictive value, later studies have shown short-term persistence in investment performance, but this persistence has been found to be short-lived, and only to work in certain market cycles. For example, if the analysis of past performance statistics produced a positive future alpha or differential return for a selected group, it might be minor and temporal, such as a 1% advantage lasting less than two years. Still later commentators have cited qualifying factors such as extraordinary market conditions and reversal of cycles, to explain away patterns that might otherwise be profitably exploited in an analysis of past performance.

In addition to academic study, the subject of investment portfolios and securities has been the subject of various patents, particularly in the last few years. Few of these patents deal with the issues of asset allocation among classes or the selection of investments within an asset class. Fewer still attempt to predict future performance on any basis. One general approach of the patents dealing with predictive processes in regards to asset allocation and investment selection is to analyze external factors (as opposed to past performance and other factors intrinsic to the investments under consideration) to select investments or asset allocation strategies. External factors include "external economic factors", "anticipated changes in economic factors", "market conditions", "target and failback scenarios", and "predicted market performance". U.S. Pat. Nos. 5,774,881; 5,884,287; 5,987,433; 6,018,722; 6,021,397; 6,078,904; and 6,125,355 are exemplary.

Another general approach in the prior art is to select asset allocation strategies or make investment selections based on differences in future performance as predicted by a third-party or as anticipated by assuming the ongoing persistence of historical performance. U.S. Pat. No. 5,806,049 uses external existing information on the characteristics of the investments, e.g. current ownership of assets, and anticipated changes in the quantity available. U.S. Pat. No. 6,003,018 assumes an external source of forecasts, e.g. a defined expected return and a defined standard deviation of return for each asset. U.S. Pat. No. 5,784,696 assumes that future returns and risks will equal historical returns and risks for each alternative. Likewise, U.S. Pat. No. 5,109,475 describes a predictive neural network that relies on the assumption that future risk and return for a stock will equal past risk and return. U.S. Pat. Nos. 5,761,442 and 5,978,778 attempt to predict future stock or security performance exclusively on the differences in individual performance values such as strong price momentum, historical price and volume, earning, cash flow, etc.

None of these known theories, models or techniques has found acceptance as a reliable method for looking at past investment performance to predict future investment performance over an extended period, namely, more than a year. Nor have any of the known theories, models or techniques proven to be reliably strongly superior in predictive power or reliable irrespective of market cycles.

It is therefore a principal object of this invention to provide a method of selecting for investments within an asset class of book-valued assets that does reliably predict differences in the future performance of selected investments within that class for at least 36 months.

Another principal object is to provide a method with the foregoing advantages that is strongly predictive, and is reliable regardless of market conditions, and produces a magnitude of superior future performance that justifies the cost of practicing the selection process.

SUMMARY OF THE INVENTION

This present invention provides a process for selecting a group of book-valued collective investment funds ("book-valued funds" or "funds"), on the basis of differences in past investment performance, from among a population of such funds within an asset class, whose future investment performance will be stronger than that of the average of the population's investment performance for at least thirty-six months. The processes identifies predictive differences in the population of the funds, namely, anomalies in population density distribution from what would be the expected population distribution under a normal distribution. In the presently preferred form, this identification is by forming groups within the population. This forming divides the population arranged in a two-dimensional risk-return space that illustrates investment performance. The dividing is into areas of theoretically equal populations based on an assumption that the population is uniformly random and distributed through that space with a normal distribution about a center point of the population. The identification process of this invention then uses the discovery that the population density is not uniform—there exist unanticipated anomalies in the distribution of funds within an asset class around their average, when that population is catalogued in terms of investment performance.

This invention then makes use of these unanticipated anomalies in population density to select groups of funds within an asset class whose future performance will consistently be stronger than the asset-class average. More specifically, to make use of these anomalies, the presently preferred form of this invention measures the actual population of funds in each theoretically equal area. The areas are then ranked based on these measurements. One or more high-ranking (more population dense than other) areas are selected. The funds in this area, or a composite of such areas, are selected for future investment. This performance advantage is statistically significant for up to thirty-six months following the selection date. Used in conjunction with other selection criteria based on indices of past performance, the magnitude of the advantage of this selection over this period is also economically significant, with an average alpha or differential return over the class asset average typically exceeding 2% for the period. The result is a consistent and reliable method for selecting investments that will outperform their asset-class peers. The use of this invention is to create and maintain a group of such investments within asset classes made up of book-valued collective investment funds.

The performance criteria analyzed are past periodic returns. The risk is denominated as the variance of those past periodic returns around their average for each of the book-valued funds in the population. Alternatively, the risk can be denominated as the co-variance of those past periodic returns to the average past periodic returns for the funds in the population or for an associated market index. The average return is calculated as the geometric average of those periodic returns.

This process preferably divides the population into at least four theoretically equal population areas, and up to twenty-five such areas. Sixteen or twenty-five areas are presently preferred. More areas can be created, but there is little observed improvement in the performance of the selection process to justify the additional burden of creating, measuring and ranking these additional areas. It should be understood that use of any number of population areas is considered to be within the scope of the present invention.

In a sixteen-area division, by way of example, the population distribution is divided along the risk dimension into "portions" along lines at 0.675 standard deviations from a center point for that risk. Each portion is then divided along the return dimension at lines 0.675 standard deviations from a center portion of the returns in the associated portion. The past measured period is a period that has proven valid consistent with the conventions adopted by the investor. At least a five-year period is presently preferred. Two or more high-ranking selected areas can be combined to form a composite selected area. In this quartile, sixteen-area segmentation, four selected high rank areas are preferably combined into one composite selected area. Theoretically, such a four-area group should hold 25% of the total asset class population, under the assumption of a normal distribution of asset-class investment performance.

An alternative grouping strategy, in accordance with the present invention, is to combine up to four of the sixteen-segment areas that reside closest to the center point of the population for average returns and returns variance. Such a grouping relies on the fact that the distribution of investment performance for an asset-class population is usually leptokurtic. That is to say, that in most periods the population immediate to the center point for average return and return variance within an asset class is more dense than anticipated under the assumption of a normal distribution.

To enhance the effectiveness of this invention, once an area or areas has been identified, ranked and selected, the funds in that area are further processed according to the present invention by eliminating (i) funds that have front-end or deferred sales charges, and (ii) small funds, that is, those with a net asset value that is less than 1% of the net asset value of the largest funds in the population, typically calculated as the average size of the largest ten funds.

The process of this invention is repeated periodically, e.g. 36 months after a selection of the funds. The funds are sold and the proceeds reinvested, again following the process of this invention.

DETAILED DESCRIPTION OF THE PREFERRED EMBODIMENTS

Figure 1:
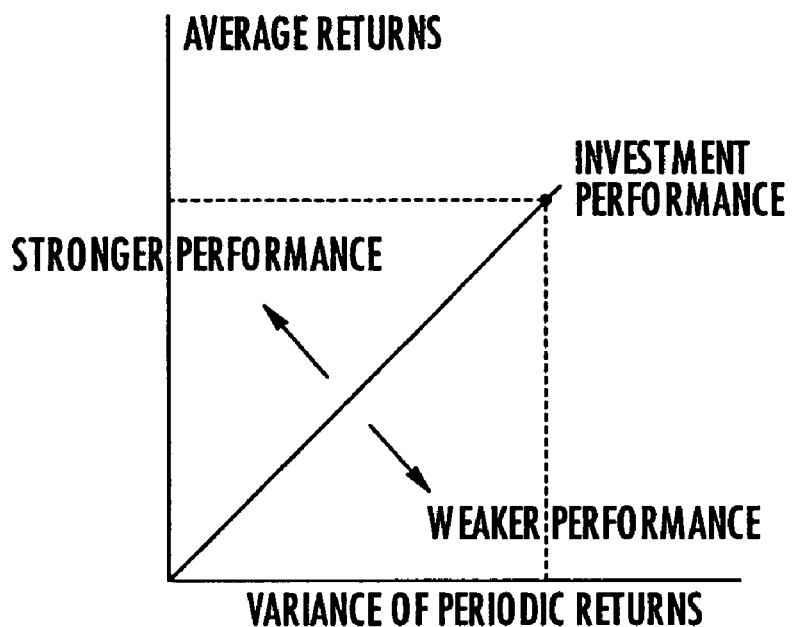
FIG. 1 is a prior art graph of investment performance of investments plotted as a function of their periodic returns (y-axis) and the variance on those returns (x-axis)

Investment management practices are governed by definitions of investment performance and models of investor behavior and optimal portfolio structure developed within the academic literature of the last 50 years. For an invention to be judged beneficial in this field, it must be demonstrated to work within the context of this existing analytical framework. The present invention therefore uses and builds on definitions and models already known in the industry to provide an improved method for selecting investments to optimize return.

Prior art FIGS. 1-11 are discussed in detail below both in connection with actual prior art methods as well as the method of the present invention. Such discussions as to the method of the present invention are employed to illustrate the applicability of such method to known concepts and principles in the prior art figures but it is not meant to show that the method of the present invention is disclosed or taught in such prior art figures.

The Process of the Present Invention—Overview

The method of the present invention includes the steps of calculating historical performance data for a population of collective investment funds, segmenting those funds into groups based on that historical data, and then calculating the average returns and returns volatility of those groups over the subsequent 36 months. For that analysis, since collective investment funds generally report historical returns and volatility using year-end annual return data, results reported herein are using the average returns and returns variance for historical data on that basis. Investment managers generally report to their clients on a quarterly basis using twelve-month return data for each quarter-end for the calculation of average returns and return volatility. Results and conclusions reported in this specification calculate the average returns and returns variance for 36-month data on that basis.

There exist other definitions of investment risk in use in the industry. The most widely utilized alternative is definition created from the work of Dr. William Sharpe. Dr. Sharpe's thesis noted hereinabove, Capital Asset Pricing Model ("CAPM"), was published in 1964. It has become a cornerstone for investment management practices for a number of important reasons—not the least of which is that it provides the mathematical model to rationalize the use of an asset class proxy to stand for the investment performance expected from the individual investments within that asset class.

In Dr. Sharpe's CAPM, investments within an asset class are expected to have identical risk-adjusted returns. The CAPM assumes that the relationship between an investment's average returns and returns variance can be plotted to a straight line drawn from a point of average return for a zero-variance asset or index through the point of average return and return variance for the asset class or an associated market-index. The model uses a relative measure of returns variance—"beta"—that is calculated as the covariance between that investment's periodic returns and those of the asset class average or associated market-index, divided by the variance of the periodic returns for that the asset class average or associated index.

The CAPM has gained wide industry acceptance, and along with it, "beta" has become a standard measure of investment risk. This invention operates with, and has been proven using, both this relative-risk measure, as well as the absolute-risk measure—standard deviation of periodic returns—developed by Dr. Markowitz.

Future Investment Performance Stronger than that of the Average of the Population's Investment Performance It is a standard industry practice to communicate risk-reward relationship of investment performance as a two-coordinate graph—a "mean-variance" graph—where the average of the periodic returns for an investment is plotted on the y-axis as a function of their variance (x-axis). This graph will also be referred to herein as a "plot", "space" or "display".

Using the means-variance graph, the performance of an investment is illustrated by the slope of a line from the y-axis through the points of average return and variance for investment. The greater the slope, the stronger the investment performance of the investment. Prior art FIG. 1 shows such a graph and regions of strong and weak performance.

In CAPM, Dr. Sharpe identified the average investment performance across the range of returns variance found within an asset class as a "securities-market line" or "equilibrium line" E as shown in prior art FIG. 2. He postulated that the expected return for an individual investment within that asset class could be calculated by the equation:

$$R_i = R_f + \beta_i(R_m - R_f) + \in$$

where, the average return for an investment within an asset class $R_i$ is defined by a line from the average return of a riskless investment $R_f$ of slope "beta" $\beta_i$, through the net average return for the asset class or an associated market-index ($R_m - R_f$). Of note in this equation, is the term $\in$, known as random error. CAPM assumes that a deviation in investment performance for an individual investment within an asset class from this equilibrium line is the product of 'random error', and that the term $\in$ is a random variable of normal distribution and zero mean. Therefore, heretofore, the conventional wisdom has been to assume that the distribution of performance differences for a population of investments within an asset class is symmetrical and that their density conforms to that of a normal distribution around the equilibrium line, and to discount evidence of population densities within an asset class populations as calibrated for investment performance that may countermand this assumption as an anomaly or measurement error.

Figure 3:
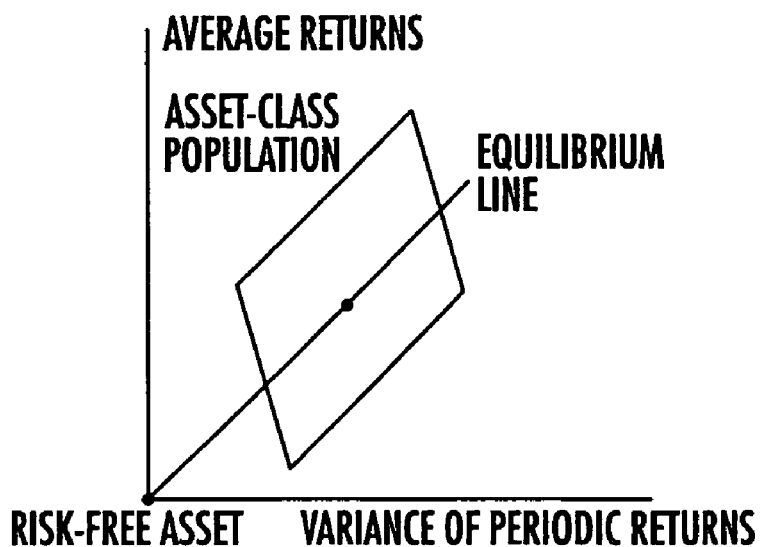
FIG. 3 is a prior art graph corresponding to FIG. 2 showing an investment performance distribution boundary for an asset class.
Figure 15:
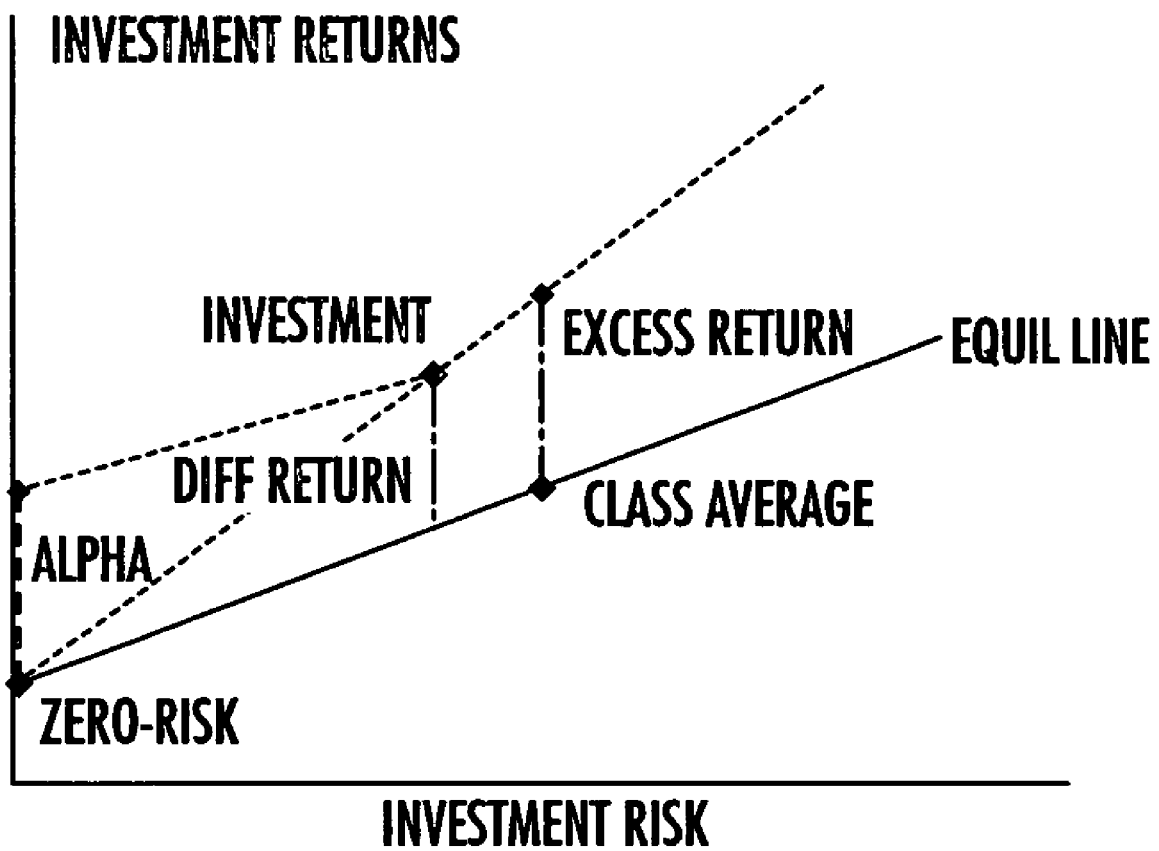
FIG. 15 is a prior art graph corresponding to FIGS. 1-3 illustrating alternative methods of measuring differences in investment performance.

From this equation, the characteristic distribution of an asset-class population around its average investment performance can be illustrated on a mean-variance graph shown in prior art FIG. 3:

Illustrated in FIG. 15 is the condition that an investment whose investment performance is stronger than that of its asset-class average is one whose position on this mean-variance graph resides above the equilibrium line. There exist different conventions for measuring this vertical distance above the line. The measurement can be taken at the point where the investment resides along the x-axis—that difference computed is the investment's 'differential return'. A line can be drawn from the risk free asset through the point of average returns and returns variance for an investment—the distance from that line to the equilibrium line at the point along the x-axis at which the asset-class average or associated indice resides is called the 'excess return'. If one were to draw a line parallel to the equilibrium line through the point of average return and return variance for an investment when that variance is calculated as beta and measure the distance between that line's intercept along the y-axis and the risk-free asset rate of return, that difference is an investment's 'alpha'.

This invention uses an investment's differential return is the measurement most appropriate for calibrating differences in investment performance for portfolio management purposes. However, all three measures indicate that same fundamental principal—a positive difference means a stronger investment. The present invention works with either of these conventions.

A Graphical Segmentation Implementation of the Present Invention

The present invention selects a group of book-valued collective investment funds from among a population of such funds within an asset class.

The asset-class structure is based on the tenets of Modern Portfolio Theory (MPT), and is an essential structure for designing asset allocation strategies for the process of investment portfolio management.

Figure 2:
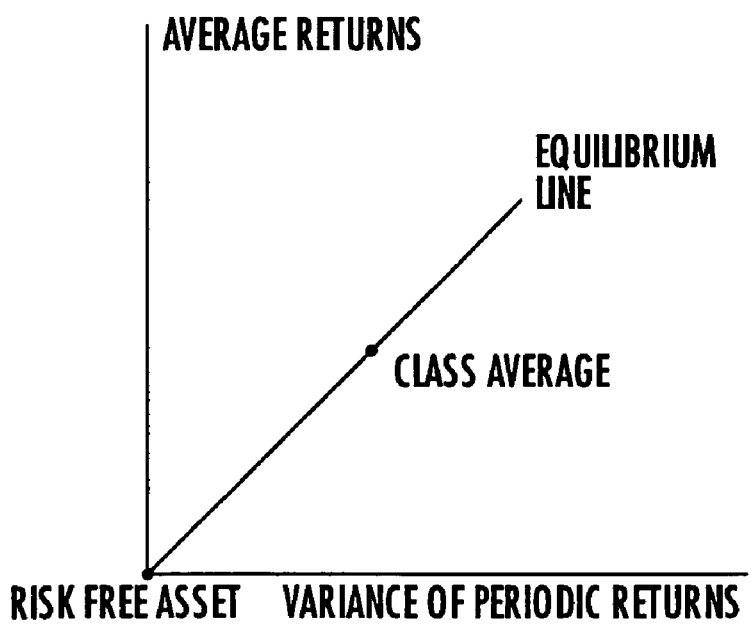
FIG. 2 is a prior art graph corresponding to that shown in FIG. 1, with an equilibrium line and class average or center point shown.

The selection process of this invention displays a population of book-value funds on a Markowitz two-dimensional, "mean-variance" graph. The average return for an investment is marked on the y-axis and the variance of returns on the x-axis as shown in FIGS. 1-3. This invention also uses, in its presently preferred form, a Sharpe equilibrium line (FIGS. 1-3) drawn from a point of the average rate of return for a riskless asset through a point for the average returns and returns variance for the asset-class average, or an associated market index.

The actual distribution of investments within an asset class do not conform to this equilibrium line, but form a scatter around it. Sharpe's CAPM assumes that this scatter is a product of random error, and that the frequency distribution of risk adjusted returns for investments within an asset class around the equilibrium line forms a normal distribution. By the rules of joint probability, an assumption of a normal distribution for the risk-adjusted returns of the investments within an asset class creates the assumption of a normal distribution for the average return, as well as, for returns variance for the population.

Figure 4:
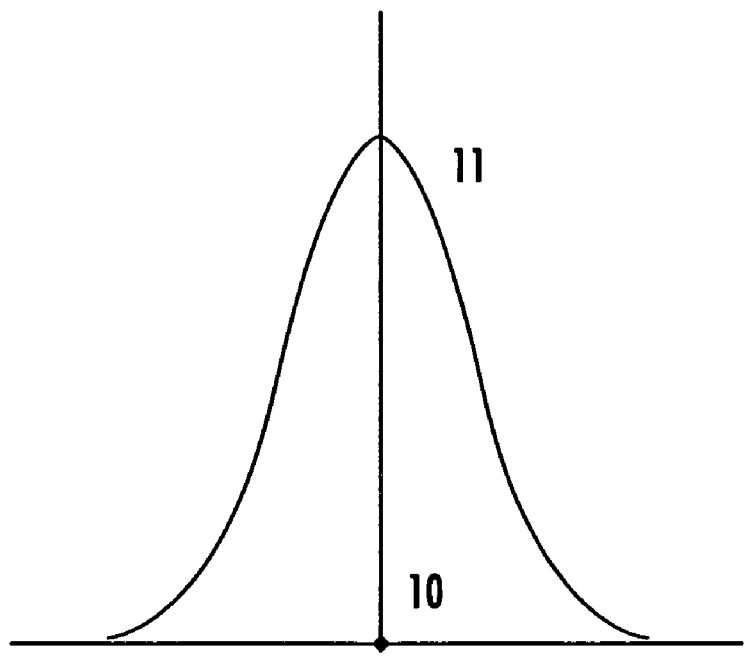
FIG. 4 is a prior art graph showing a normal distribution around a point on an asset class equilibrium line as shown in FIGS. 1-3.

FIG. 4 illustrates the assumptions of CAPM and other asset pricing models, where point 10 is a point on the asset-class equilibrium line denoting either average return or return variance, and line 11 is the curve describing a normal distribution around that point. The most rigorous interpretation of CAPM assumes a normal distribution curve; less rigorous interpretations are satisfied with a symmetric stable distribution around an equilibrium line.

The present invention includes the insight that the normal and symmetrical distribution of investments of an asset class in terms of their average returns and returns variance only exists in theory, an asymmetrical distribution is the common population characteristic of investments around an equilibrium line.

Figure 5:
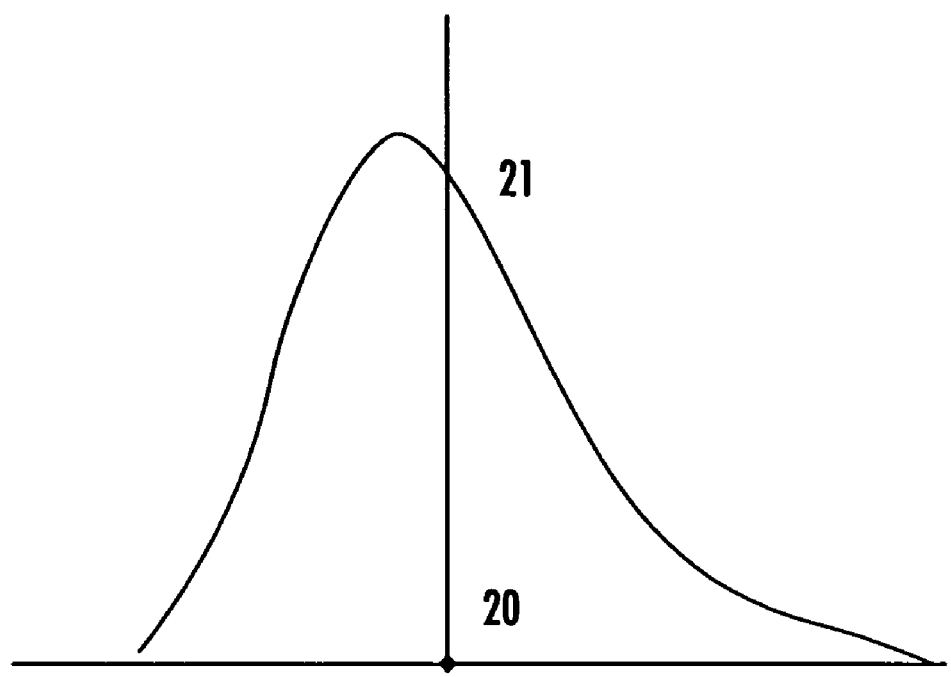
FIG. 5 is a prior art graph corresponding to FIG. 4 showing a skew asymmetry distribution around a point on an asset class equilibrium line as shown in FIGS. 1-3.
Figure 6:
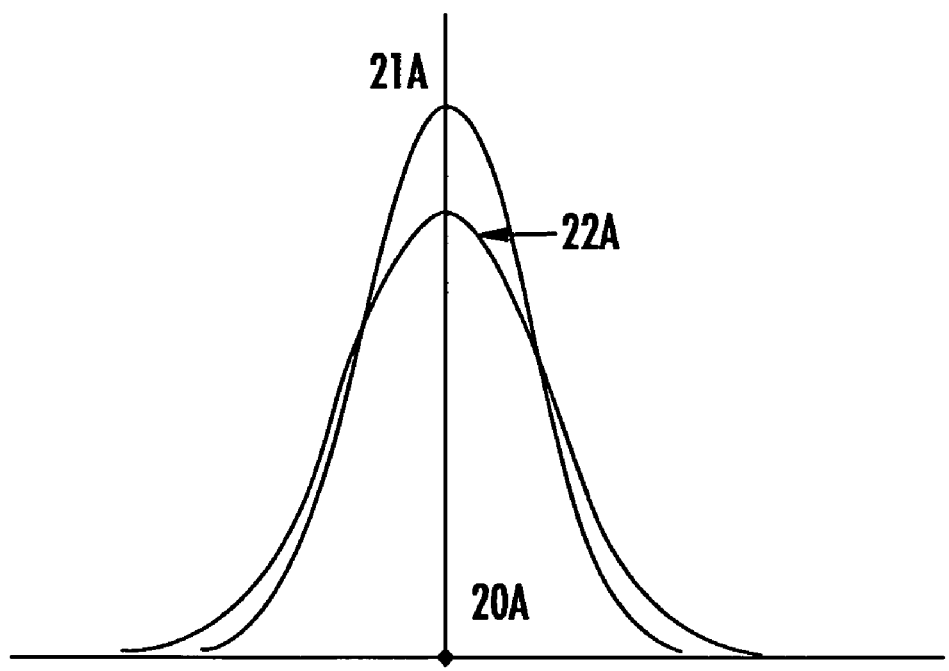
FIG. 6 is a prior art graph corresponding to FIG. 4 showing a leptokurtic distribution around a point on an asset class equilibrium line as shown in FIGS. 1-3.

Such an asymmetrical distribution, a skewed asymmetry, is illustrated in prior art FIG. 5. Point 20 is a point on the asset-class equilibrium line denoting either average return or return variance. Line 21 is the curve describing a asymmetrical distribution of positive skewness around that point. (Although not illustrated, the curve could just as well be of negative skewness, with the long tail to the left of a point of the equilibrium line).

There also exists a general condition of leptokurtosis in the distribution of risk-adjusted returns for funds within an asset class over most periods. Leptokurtosis is a condition of 'peakedness' whereby the density of a population closest to its central point is higher than expected under the assumption of a normal distribution. Such a leptokurtic distribution is illustrated in prior art FIG. 6. Point 20A is a point on the asset-class equilibrium line denoting either average return or return variance. Line 21A is a curve describing the distribution frequency of the funds around this point for a normal distribution. Line 22A is a curve describing the distribution frequency of a leptokurtic population of funds.

Figure 7:
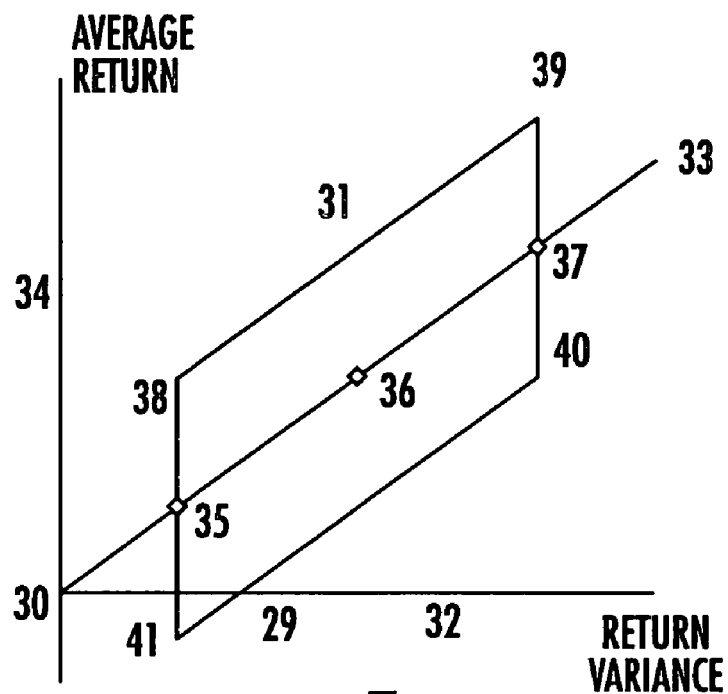
FIG. 7 is a prior art graph showing a parallelogram boundary for the population about the equilibrium line of FIGS. 1-3.

To illustrate this invention, prior art FIG. 7 shows the boundaries of population distribution around an equilibrium line within an asset class as a parallelogram 31 congruent to that equilibrium line 33 (or E) and comprising points 38, 39, 40 and 41.

Figure 8:
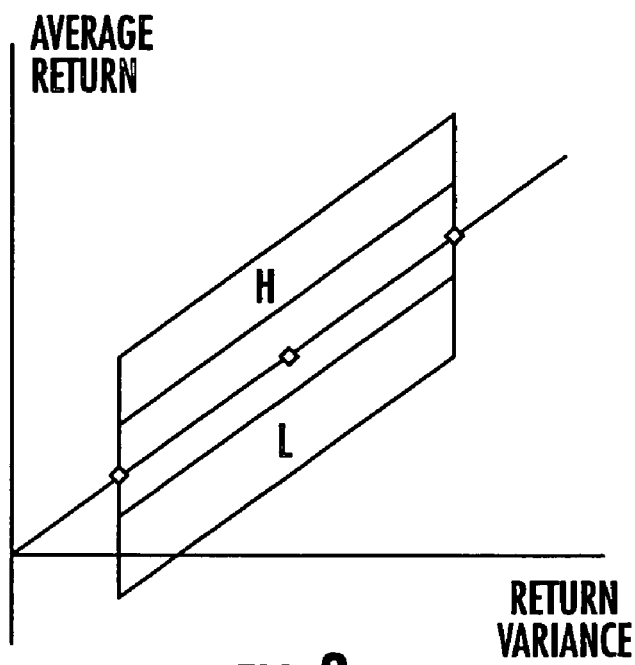
FIG. 8 is a prior art graph showing the parallelogram population boundary of FIG. 7 divided into risk-adjusted return quartile groupings.

Heretofore, attempts to find differences in factors of past performance that predict future performance among investments within an asset class has sought to categorize those differences in terms of the rank order of the population of performance values found within the asset class. A common process has been to look for persistence in differences in risk-adjusted returns. If one were to form quartile categories or "portions" of an asset class population in terms of risk-adjusted returns, the parallelogram would be divided, as shown in FIG. 8, from the lowest (L), to highest (H) values found.

Figure 9:
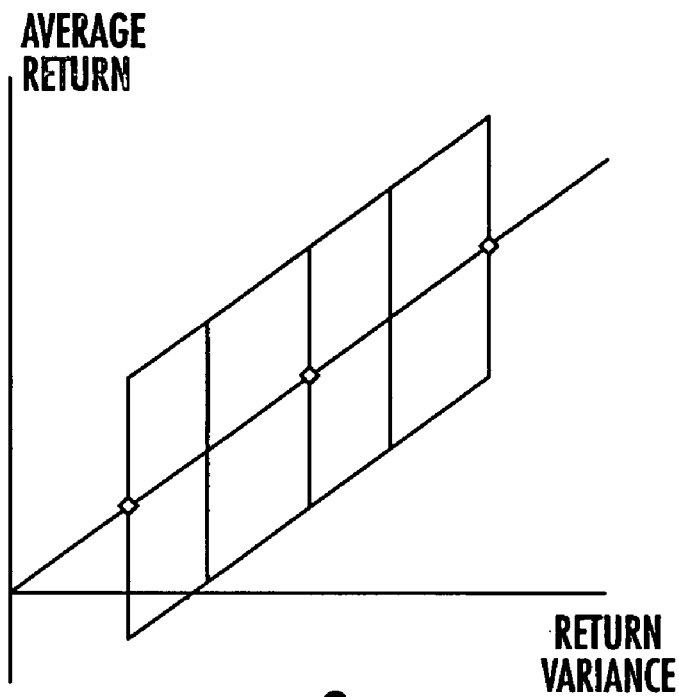
FIG. 9 is a prior art graph corresponding to FIG. 7 showing return variance grouped in quartiles.
Figure 10:
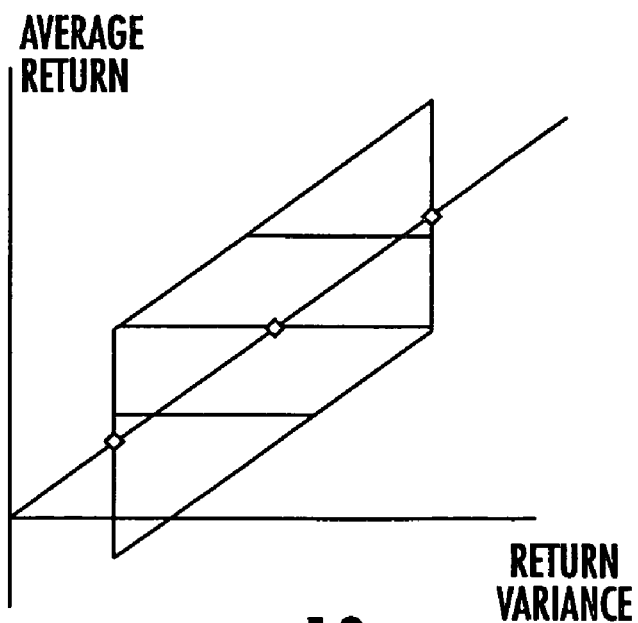
FIG. 10 is a prior art graph corresponding to FIG. 7 showing average returns grouped in quartiles.

Quartile categories of an the asset class population in terms of returns variance could also be formed, and the parallelogram would be divided generally as shown in prior art FIG. 9. This has been a common process for creating portfolios to analyze whether funds can reliably outperform the market.

Another option utilized in the past to find look for performance persistence has been to form groups based on average returns—to explore whether 'winners repeat'. If one were to form quartile categories "or portions" of an the asset class population in terms of average returns, the parallelogram would be divided generally as shown in prior art FIG. 10.

Figure 11:
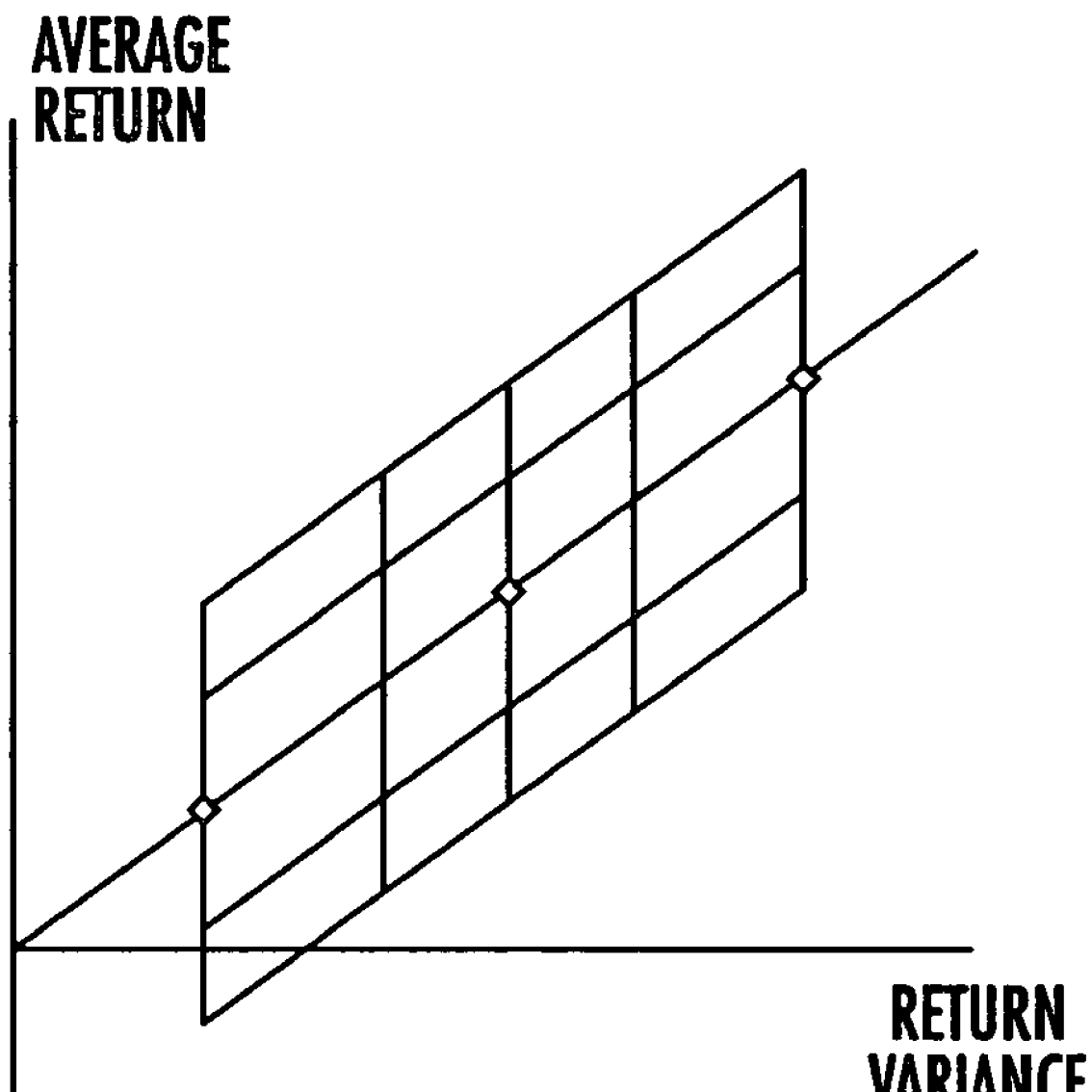
FIG. 11 is a prior art graph showing sixteen population areas formed by combining the average return and return variance quartile rankings of FIGS. 9 and 10.

Finally, if one were to first create quartile categories of return variance by rank-order of the range of values, and then rank-order and categorize the funds in each returns-variance category by average return, the asset-class population would form a grid of segments or areas 50 as shown in prior art FIG. 11.

FIGS. 8-11 are examples of the general ways in which practitioners have attempted to identify differences in past performance which predict differences in future performance. Industry experience with these methods is that they do not lead to economically viable results. Any future differences identified either have not been of the magnitude or persistency to provide a positive economic return, or could be explained as the product of extraordinary conditions in markets external to the asset class, and thus not necessarily replicable across all economic conditions.

The process of categorizing a population by rank-ordering of its performance values ignores any spatial differences in the distribution of that population. By definition, each portion is constructed to contain an equal percentage of the population. For the example immediately above, each category or area 50 within the 16-square grid of prior art FIG. 11 would contain 6.25% of the asset-class population. In practice, to create this uniformity of population distribution, the dividing lines would be mutually spaced less evenly than shown to reflect the tendency of population to group closer to a center point than an extreme point.

Figure 12:
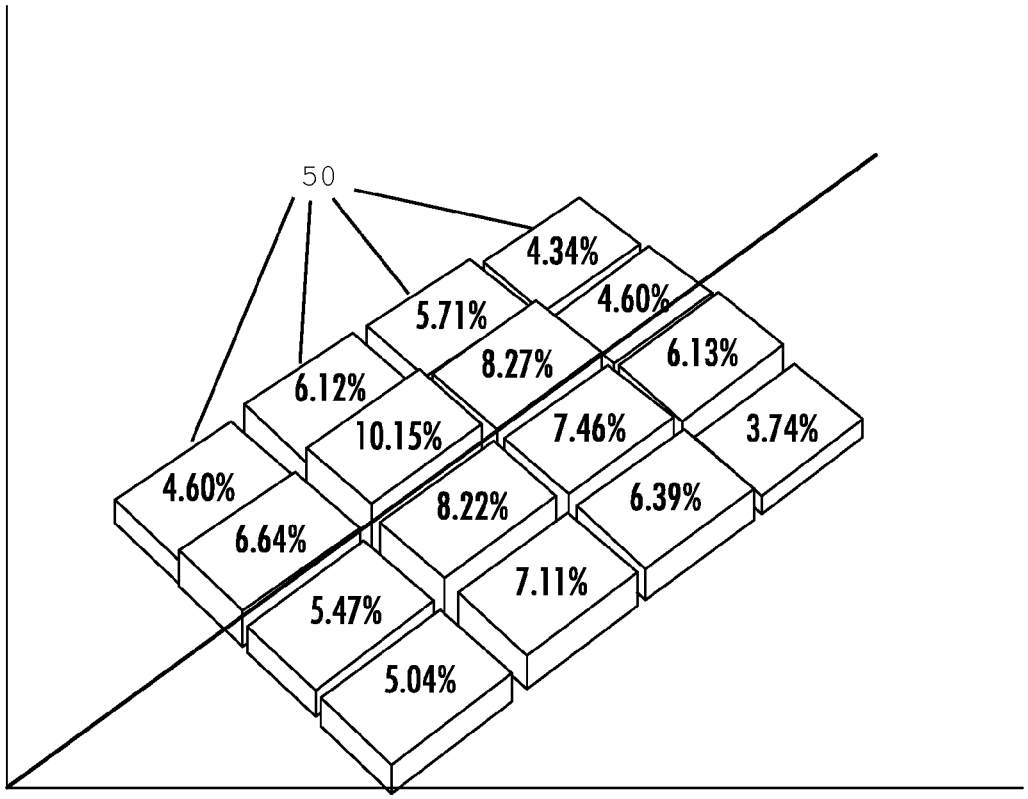
FIG. 12 is a graph according to the present invention showing sixteen population areas formed by combining the average return and the return variance quartile rankings with actual population density distribution per segment.
Figure 13:
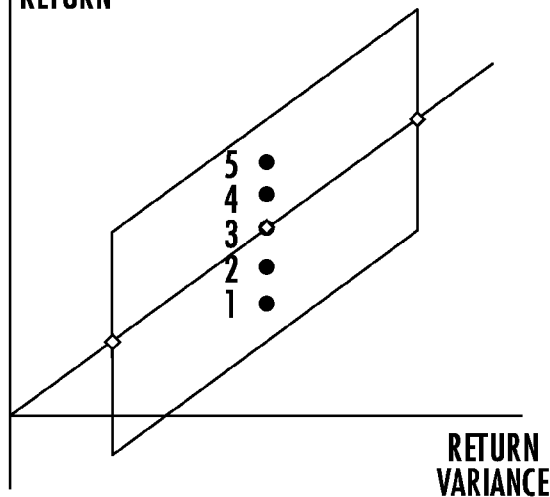
FIG. 13 is a graph corresponding to FIG. 12 showing the future risk adjusted returns for five composite groups of funds selected according to the present invention, groups I-IV corresponding to the adjusted return points 1-4, respectively, and point 5 corresponding to the return if Group IV adjusted for size and sales load.
Figure 14A:
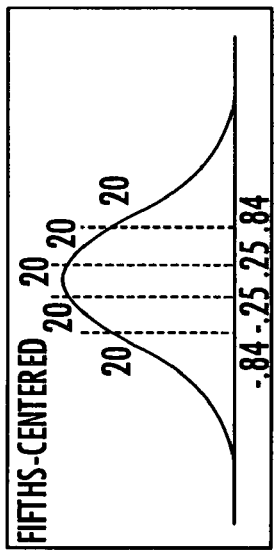
FIGS. 14*a*-14*h* illustrates alternative segmentation strategies for a population with a normal distribution.
Figure 14B:
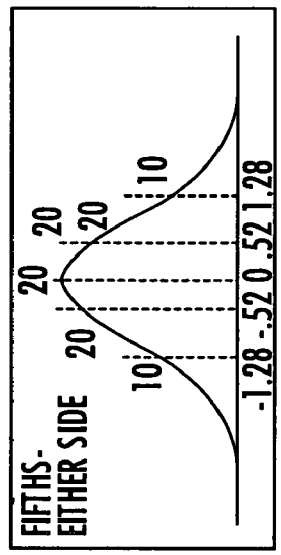
Figure 14C:
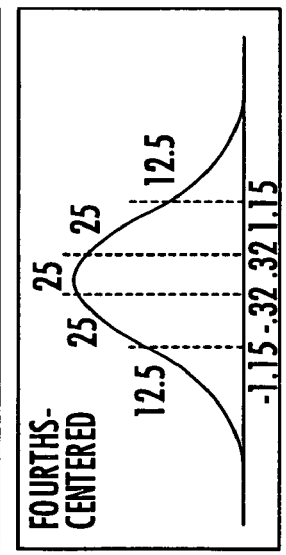
Figure 14D:
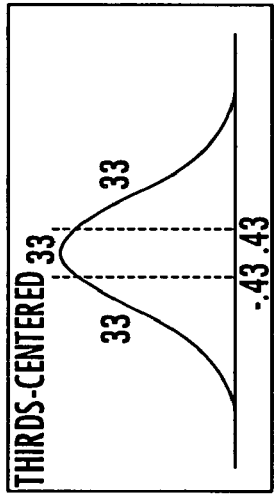
Figure 14E:
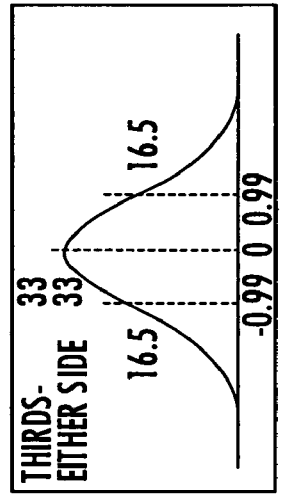
Figure 14F:
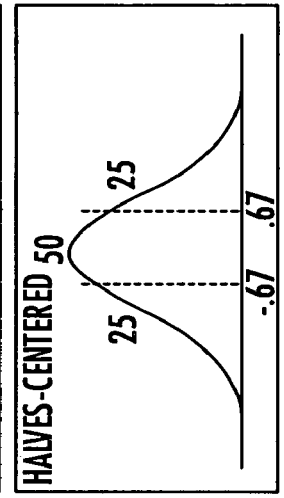
Figure 14G:
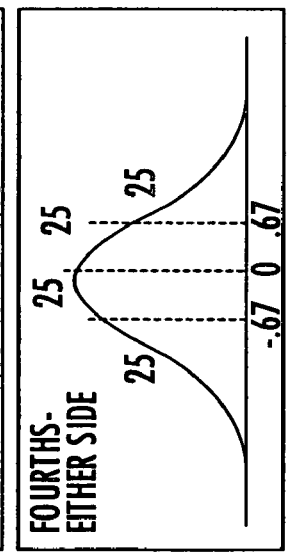
Figure 14H:
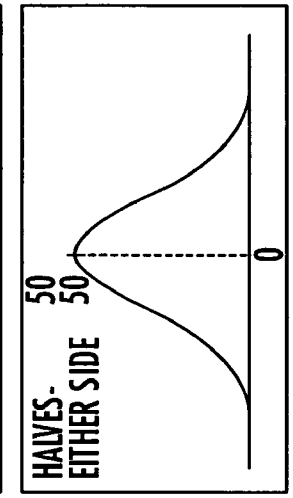

In contrast, as shown in FIGS. 12-14, the process of this invention relies on the identification of differences in the distribution and population density of performance values within an asset class to construct categories of prior factors that will predict future performance. In this categorization process, the spatial characteristic of the asset class population are paramount.

In accordance with the method of the present invention, funds are first grouped in terms of their distance from the mid-point of the returns variance for an asset class. The funds in each of these groups are then categorized in terms of their distance from the mid-point of the average returns for their group. For purposes of the illustration but not limitation, the present invention is described using a quartile grouping (or "portioning") for both the returns variance and average returns categorization—creating a sixteen-square grid for the distribution of funds around an asset-class equilibrium line in similar fashion to prior art FIG. 11. However, the grid illustrating the method of the present invention is shown in FIG. 12 which is based upon the spatial nature of the performance characteristics of a population rather than their rank order.

In the prior art, the population density of funds around this line forms a normal distribution. Therefore quartiles constructed using the boundary ±0.675 standard deviations from the midpoints for returns variance and average returns within each returns-variance category should, in theory, result in an equal percentage of the population in each of the sixteen squares. This invention utilizes the insight that this in fact never happens. A pattern of unequal distribution among the categories is the prevailing character of an asset-class population.

In contrast, FIG. 12 of the method of the present invention illustrates a typical actual population distribution with the population density in each area 50 displayed in a percentage of the total population (100%). Rank-ordering and regrouping these sixteen squares by population size generates four population groups of significant size variation. Table A below illustrates this for the distribution shown in FIG. 12.

TABLE A

| group | characteristic | percent of total population |
|---|---|---|
| IV | four most-populated areas 50 | 35% |
| III | | 26% |
| II | | 22% |
| I | four least-populated areas 50 | 17% |

The method of the present invention uses this density variation to predict a consistent and regular difference in future performance. The group IV formed of the four most densely populated areas 50 out-performs the asset-class average by the greatest margin. The group I of the four least populated areas 50 under-performs that average by the greatest margin. This variation is statistically significant for all periods and asset class configurations tested, and is economically significant in cases where the variation in performance among the funds of an asset class is economically significant. Additionally, grouping by population size increases the effectiveness of other characteristics differentiating funds within an asset-class in predicting differences in future performance. Differences in sales expenses and asset-size have not heretofore been found to be sufficient indicators of future performance differences across asset-class populations. However, selecting for funds within the most-densely populated group of an asset class on the basis of differences in these characteristics consistently yields significantly stronger future performance across all periods and asset classes tested.

In an alternative embodiment of the method of the present invention, a significant anomaly in population densities is selected for the four areas 50 closest to the center point for average returns and returns variance for the population, relying on the condition that asset class populations of funds are usually leptokurtic. The density for these four closest areas 50 within the aforementioned sixteen-square example is similar to that produced by combining the four most-densely populated areas 50—34% of the total asset class population. The advantage of future investment performance enjoyed by this closest-group over their peers within the asset class is also on par with that created from the selection of the four most-populated areas 50 for the periods and asset classes tested.

FIG. 13 identifies group IV as funds selected from the most populated four areas 50 in FIG. 12 through to group I as funds from the least populated four areas, and group V is those funds within the most populated four areas whose asset-size is greater than the lowest 1% of the asset class and who carry no sales load. The distribution of future risk-adjusted returns at 36 months from selection is shown in FIG. 13. The difference in future performance produced by selecting for the most populated areas and for funds within the most-populated areas whose asset size is greater than the lowest 1% of the asset class and carry no sales load is similar to those funds selected from the four areas 50 closest to the asset class center point of the like sales load and size characteristics.

The Process for Carrying Out the Present Invention

The process of this invention in its presently preferred form, as exemplified by FIGS. 12-13, and based on the accepted known models and techniques of FIGS. 1-11, can be stated as a series of operations as follows:

Step 1. Mutual funds with at least 5-years operating history are grouped into asset classes as determined by unique commonalties in the pattern and level of the prior-period returns. The criteria for time of operations is not critical as long as it provides the minimum number of periods necessary to calculate a valid returns variance. Other period criteria than 5 years can work, but they have not as yet been tested. The choice of mutual funds as the subject population is also not critical. This invention may be employed for any combination of book-valued collective investment funds found in either the domestic or foreign markets. A limiting criteria is that differences in investment performance between members of the asset-class have been found historically to be significant enough to warrant the effort of using the process of this invention. In that regard, although domestic money-market and bond funds make for distinctive asset classes, the process of this invention has not been applied to these asset classes because, historically, differences in investment performance between money market funds and between investment-grade bond funds have not been significant relative to the expense of implementing the invention.

Step 2. The average return and return variance for each fund over this 5-year period is calculated. This variance can be calculated either in terms of the variation of periodic returns around the fund's average return (standard deviation) or as the variance of the fund's periodic returns in relation to those of the asset class average's, or an associated market index's periodic returns (beta).

Step 3. A mid-point for returns variance is calculated for the asset class, as well as a measure of the average variance for the population of returns variances from this mid-point. This mid-point is calculated as the average of asset-class returns variance. This process relies on the validity of the Central Tendency Theorem—the statistical concept that the distribution of a random population becomes more dense around its central point—and the invalidity of the tenets of CAPM—that the distribution around this central point is symmetrical.

The method of choosing a central point is not critical. The central point can as easily be calculated as the asset-class median (50% percentile rank), or even mid-range. The mid-range mid-point does not appear to work as well as the other mid-points. This is believed to be because of the extreme skewness asset-class populations in certain periods, especially in terms of the distribution of return-variance. This skewness can lead to very large segments when the range is divided by its length, and a mid-point that can be extremely skewed away from the population center.

The measure of population-dispersal around this mid-point is a calculation of the standard deviation of return variance for the asset class. This is a convenient and most generally-accepted measure of variability around a mid-point. However, it is not the only way to calculate the spatial characteristics of the asset-class population, and this invention is not limited to this method.

Step 4. A fund's returns variance is 'standardized', a statistical technique whereby a measurement is transformed into units of the population's mid-point and average variance. Using this standardized measure of returns variance, the individual members of the asset class are segmented into groups by their relative distance and direction from the calculated mid-point of asset-class returns variance. Using, for example, quartile segments or "portions", as in FIGS. 11 and 12, the population is first divided into four groups by their distance from the mid-point for returns variance. Then, a mid-point for average returns and the standard deviation of average return is calculated for each of these portions, the measurement of the average return for each of the funds in each portion is standardized and then each portion further divided by quartiles based on the funds distance and direction from the mid-point average return for each portion. This segmentation divides the asset class into sixteen areas 50 in terms of investment performance.

Note that this segmentation of the population is drawn at dividing lines that assume the quartiling of a random or normal distribution of the population. Such a quartiling entails drawing a dividing line at ±0.675 standard deviations from the mid-point of returns variance to create four portions, and then ± standard deviations from the mid-point for average returns for each of the portions to create sixteen squares of assumed equal population. Other segmentation scaling criteria could also be used, such as deciles, octiles, and halves and still be within the scope of the present invention. A segmentation or "scaling" into four to twenty-five areas 50 is recommended. A finer scale, in excess of twenty-five segments, has been found to lead to inadequately populated portions in smaller or greater-skewed asset classes, and to excessive volatility in the results. A scaling below four is likewise less reliable. The most useful scale for marking these segments appears, from trial-and-error, to be between 0.5 and 0.1.5 standard deviations. Wider or narrower segmentation patterns tend to obscure differences in investment performance. FIGS. 14*a*-14*h* illustrate various exemplary alternative segmentation strategies of a normally distributed population in accordance with the present invention.

Step 5. The population of funds within each of these sixteen areas or segments (other than number of segments) is counted. The segments are then ranked in order from the most-populated to the least-populated. In the preferred embodiment of the present invention, the four most-densely populated segments, regardless of their location on the risk-return graph, are combined. The next four most populated are also combined. The combination process continues until four groups of funds (I-IV) have been formed based on differences in the population density of the population in terms of their investment performance.

Step 6. The asymmetry in asset-class population density is used to select for a group of funds whose future investment performance will be stronger than the average for its asset-class for up to thirty-six months following selection. Specifically, those funds within the most-densely populated quartile, such as group IV in the foregoing Example, are selected. These funds, so selected, have been found to identify a group that will generate a consistent and statistically significant level of investment performance above that of the average of their respective asset class peers across a variety of market conditions. The selected "high" ranking area 50 or composite area is typically the densest one or more areas, but the selected area need not be made up exclusively of the highest ranking areas in terms of population size. As discussed in more detail below, for example, other combinations of areas 50 which result in a composite area whose population density is higher than anticipated under the assumption of a normal distribution can be effective, as well.

Step 7. Alternatively, those four areas within a sixteen-square segmentation whom are closest to the center point can be selected under the assumption that this group will, in most periods, result in selecting for a population of funds whose density is greater than expected from the assumption of a normal distribution. This assumption arises from the finding that in most periods, the distribution of funds within an asset class is leptokurtic; that the density of the population of funds closest to the center-point of an asset class is greater than anticipated by the assumption of a normal distribution of investment performance around that center-point.

Step 8. A portfolio is established to hold the selected funds of each asset class. For example, each quarter, that group of funds that has been in portfolio for at least 36 months is sold, and the proceeds used to purchase a group of funds selected by steps 1-6 of this process undertaken for the current quarter.

As presently envisioned, this portfolio will itself be a book-valued collective investment fund. Within the group of funds identified for selection, those funds that carry a front-end or deferred sales charge are not selected. Such a sales charge represents a discount to principal that needs to be recouped over the next thirty six months and will impair the ability of the selected group to out-perform their peers on net.

Step 9. To improve on the performance predictive power of the process described above, it is highly desirable to conduct an additional fund selection step on the selected funds. As one such improvement step, the fund population for each asset-class is ranked and grouped by categories of net asset size, and the smaller funds eliminated. The frequency distribution of funds within an asset class, when calibrated by net asset size forms a severe positive skew, with between 50-60% of an asset-class population falling within a level of net assets that is equal to of less than 1% of the net assets of the largest funds in the asset class. ("Largest" has been taken to be the average asset size of ten largest funds by NAV in the population, but the exact number of these large funds used in this selection process can vary.) The funds falling within the 1% level for relative net asset size are also eliminated from the group selected from the most-populated segments.

In the past, analysts have looked for and found no advantage in future investment performance for selecting for larger funds within an asset class. The present invention confirms these findings—for an asset-class population, little if any advantage can be had from selecting those funds whose net assets are greater than 1% of the assets for the largest funds in the asset class. However, that changes for funds within the more densely populated areas 50 whose net assets are greater than 1%. For all population-density groups other than the group of least-populated segments (group I), selecting for the larger funds significantly improves future investment performance. Again, as shown in FIG. 13, using the size discriminations described above, the future adjusted risk return of the portfolio is significantly improved.

A second improvement on the selection process is to combine the processes of finding the 4-most-concentrated and 4-closest areas, and selecting for those funds that are within the union of these two sets. In operation, this union is less than perfect, resulting in a selection population only 95% of the periods tested. The resolution for this is to relax the boundaries of the closest-areas to include enough funds so that the union produces a adequate number of selections. The preferred criteria for this is to relax the standard to an area within +−1.00 standard deviations from the centerpoints for return variance and average returns.

This process, when tested on past known performance, has been found to produce future performance enhancement that yields an average differential return, or alternatively an alpha, over the average risk-adjusted return for that asset class of greater than 2% per annum. This stronger performance persists for selected funds held for up to 36 months, or more, is reliable, and is not dependent on any particular market conditions.

As will now be understood, the investment selection process of the present invention provides a reliable method for analyzing past performance of a popular type of investment vehicle to predict above average performance for several years into the future. It can be used regardless of market conditions. It does not rely on an analysis of factors external to past performance data, nor does it require the use of multiple ascertainable historical factors such as earnings, price-earnings ratios, or sales volume. It also does not require an unacceptable level of data processing. Not only is the predictive value of the process durable over an extended period, it is of a magnitude that justifies the cost of performing the process and otherwise managing the portfolio of investments created by this process.

While the invention has been described with respect to its preferred embodiments, it will be understood that various modifications and variations will occur to those skilled in the art. For example, as already stated above, while the description has focused on mutual funds, there are other collective investments that are book-valued and can be managed using this invention. Various alternative methods of calculating returns, variance on those returns, and the center point of a population have also been disclosed and can be used. Further, while the dividing or segmenting of the population to identify anomalies in population density has been described as graphically oriented and utilizing standard deviations, other techniques are known that can identify differences in population density and may be usable in the process of this invention. They include techniques known under the terms, multivariate density estimation, cluster analysis, nearest-neighbor analysis and point-pattern analysis. The assumption is prior art of a normal distribution in investment performance around an equilibrium line has been used in this invention as a method of benchmarking for significant differences in asset class populations. A normal distribution is just one such benchmark within the broader class of symmetric stable frequency distributions that may be of use in this regard. The invention has also been described with respect to scale of segmentation ideally at 16 to 25, but it can work, albeit less effectively, at scales of as low as four, and over 25. The selection of ranked areas has also been described in connection with a combination of multiple "high" rank areas to form a composite selected group of areas that define the selected funds. This combining is preferred for use with the preferred scale described herein, but it can be omitted, or used in other forms, or combined with other selection techniques, such as the three "improvements" (relating to load, size, and kurtosis) described above for enhancing the performance of the composite selected funds.

These and other modifications and variations occurring to those skilled in the art are intended to fall within the scope of the appended claims.

What is claimed is:

1. A process for selecting investments within an asset-class population of book-valued collective investment funds based on the differences in population density plotted on a graph and compiled within a data set of the points of investment performance for that population for a prior investment period, comprising the steps of:
   (a) storing as a data set within a computer device that calculates and displays summary statistical information of the data set in data records a population distribution made as a collection of the data records of the past investment performance of each of the book-valued funds within an asset class for a common investment period, said past investment performance being measured as a two-dimensional spatial distribution when displayed as a two-coordinate mean variance graph and compiled as two independent parameters within each of the data records with one dimension being the average of a contiguous series of periodic investment returns and the other dimension being the volatility of those periodic returns;
   (b) calculating and appending to the data record for each book-valued fund within this data set a normalized value for the average and volatility of its periodic investment returns as standardized against the average and standard deviation of the average of periodic returns and volatility of periodic returns for the asset-class population
   (c) appending a notation to the data record of each fund identifying it as uniquely belonging to one of a plurality of population-areas within a plot of the points of prior-period investment performance for the population of the asset-class, when formulated as a two-dimensional spatial distribution and sectioned so that the boundaries of such population-areas are drawn through the points of standardized average returns and standardized volatility of returns that would result in the division of the population distribution into plural areas of equal numbers of book-valued funds under the assumption that the asset-class population is uniformly random and forms a normal distribution about a central point for said population distribution;
   (d) counting the population of said book-valued funds in each of said population-areas;
   appending a count of that population-area to the data record of each book-valued fund within that population area;
   (e) appending to the data record for each book-valued fund a notation identifying a rank based on the population size of its population area relative to all other population area with the data set; and
   (f) selecting for future investment those book-valued funds from within the data set that are found in at least one said population-areas having a high measured population size ranking, relative to all ranks, when so ranked.

2. The process of claim 1 wherein said population distribution is a two-dimensional display and compilation of investment performance, denominated in a first dimension as the average of past periodic returns and a second dimension as the variance of those past periodic returns around their average for each of said book-valued funds in said population.

3. The process of claim 1 wherein said population distribution is a two dimensional display and compilation of investment performance denominated in a first dimension as the average of past periodic returns, and in a second dimension as the covariance of those past periodic returns to the average past periodic returns for the population for each of said book-valued funds in said population or those past periodic returns for an associated market index.

4. The process of claim 1, further comprising the step of:
   sectioning said population distribution into from four to twenty-five of said equal-sized population-areas under the assumption that the frequency distribution of values within the asset-class population, as calibrated for investment return and risk on that return, conforms to a normal distribution from a center point of investment return and risk, respectively, for a given asset class.

5. The process of claim 4, wherein said step of sectioning said population distribution into said equal-sized population-areas is by drawing a dividing line at 0.675 standard deviations from a center point of investment volatility for the asset-class to form portions of said population distribution, and then drawing a dividing line also at 0.675 standard deviations, from the center of average returns for each said portion of the population distribution to produce said equal-sized population-areas a formulated on a mean-variance graph of asset-class investment performance.

6. The process of claim 4, wherein said step of sectioning is dividing said population distribution into sixteen equal-sized areas that can be assumed to be of equal population size under the assumption of normal distribution.

7. The process of claim 1, wherein said past investment performance is calculated for a number of periods adequate for generating a valid measure of returns variance consistent with preselected conventions of measurement in use by an investor.

8. The process of claim 7, wherein said number of periods is at least five years preceding the investment selection.

9. The process of claim 1, wherein said asset class is a grouping of the funds by unique commonalties in pattern and level of said past return variance.

10. The process of claim 1, wherein said selecting comprises combining the population of two or more of the most populated areas so ranked in terms of population size to form a single composite selected area.

11. The process of claim 10, further comprising the step of:
    investing in those funds that populate said single composite selected area.

12. The process of claim 10, further comprising the step of:
    creating an investment portfolio by holding funds in said single composite selected area for a holding-period of at least thirty-six months.

13. The process of claim 10, further comprising the steps of:
    (i) divesting of funds in said single composite selected area after said holding-period; and
    (ii) using proceeds of said divestiture of funds to further invest in a group of book-valued collective investment funds using this selection method.

* * * * *